US010636292B2

(12) United States Patent
Serrano et al.

(10) Patent No.: US 10,636,292 B2
(45) Date of Patent: Apr. 28, 2020

(54) METHOD FOR DETERMINING A CONGESTION END IN TRAFFIC AND ASSOCIATED DEVICES

(71) Applicant: Bayerische Motoren Werke Aktiengesellschaft, Munich (DE)

(72) Inventors: David Gozalvez Serrano, Munich (DE); Zhe Ren, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 101 days.

(21) Appl. No.: 15/899,680

(22) Filed: Feb. 20, 2018

(65) Prior Publication Data

US 2018/0174444 A1    Jun. 21, 2018

Related U.S. Application Data

(63) Continuation of application No. PCT/EP2016/064147, filed on Jun. 20, 2016.

(30) Foreign Application Priority Data

Aug. 20, 2015 (DE) .......... 10 2015 215 914

(51) Int. Cl.
*G08G 1/01* (2006.01)
*H04W 64/00* (2009.01)
(Continued)

(52) U.S. Cl.
CPC .......... *G08G 1/012* (2013.01); *G08G 1/0133* (2013.01); *G08G 1/0141* (2013.01); *G08G 1/052* (2013.01);
(Continued)

(58) Field of Classification Search
USPC .......................................... 701/118
See application file for complete search history.

(56) References Cited

U.S. PATENT DOCUMENTS

| 6,810,321 | B1 * | 10/2004 | Cook | ................... | G08G 1/0104 |
| | | | | | 340/905 |
| 2002/0107634 | A1 * | 8/2002 | Luciani | ................ | G08G 1/0104 |
| | | | | | 701/117 |

(Continued)

FOREIGN PATENT DOCUMENTS

| DE | 198 36 089 A1 | 2/2000 |
| DE | 10 2009 047 097 A1 | 5/2011 |

(Continued)

OTHER PUBLICATIONS

PCT/EP2016/064147, International Search Report dated Sep. 13, 2016 (Three (3) pages).

(Continued)

*Primary Examiner* — Tyler D Paige
(74) *Attorney, Agent, or Firm* — Crowell & Moring LLP

(57) ABSTRACT

A method for determining an end of a tailback in road traffic includes providing a signal quality map for a cell of a base station of a mobile radio system, where the signal quality map includes overview information about signal qualities occurring within the cell. The method also includes determining signal quality information for each of a plurality of mobile radio communication devices connected to the base station, and determining a probability density function based on determined signal quality information. A location is determined of the probability density function having a function gradient which corresponds to an angular amount of at least 75° with respect to a horizontal function axis of the probability density function, where the location is indicative of a tailback limit in the cell of the base station. A location of the tailback limit is then determined based on the determined location and the signal quality map.

18 Claims, 6 Drawing Sheets

(51) Int. Cl.
*H04W 4/029* (2018.01)
*H04B 17/318* (2015.01)
*G08G 1/052* (2006.01)
*H04W 88/08* (2009.01)
*H04W 4/02* (2018.01)

(52) U.S. Cl.
CPC .......... *H04B 17/318* (2015.01); *H04W 4/029* (2018.02); *H04W 64/00* (2013.01); *H04W 4/02* (2013.01); *H04W 88/08* (2013.01)

(56) References Cited

U.S. PATENT DOCUMENTS

| | | | | |
|---|---|---|---|---|
| 2007/0005231 | A1* | 1/2007 | Seguchi | G08G 1/0104 701/117 |
| 2008/0045234 | A1* | 2/2008 | Reed | H04W 8/02 455/456.1 |
| 2015/0312882 | A1* | 10/2015 | Reed | H04W 8/02 455/456.4 |
| 2015/0362323 | A1* | 12/2015 | Koshizen | G01C 21/3492 701/430 |
| 2016/0148507 | A1* | 5/2016 | Pittman | H04W 4/029 340/917 |

FOREIGN PATENT DOCUMENTS

| | | |
|---|---|---|
| EP | 1 348 208 B1 | 8/2004 |
| EP | 2 287 820 A1 | 2/2011 |
| WO | WO 2013/135535 A1 | 9/2013 |
| WO | WO 2014/142057 A1 | 9/2014 |

OTHER PUBLICATIONS

German Search Report issued in German counterpart application No. 10 2015 215 914.0 dated May 2, 2016, with Statement of Relevancy (Six (6) pages).

* cited by examiner

METHOD FOR DETERMINING A CONGESTION END IN TRAFFIC AND ASSOCIATED DEVICES

CROSS REFERENCE TO RELATED APPLICATIONS

This application is a continuation of PCT International Application No. PCT/EP2016/064147, filed Jun. 20, 2016, which claims priority under 35 U.S.C. § 119 from German Patent Application No. 10 2015 215 914.0, filed Aug. 20, 2015, the entire disclosures of which are herein expressly incorporated by reference.

BACKGROUND AND SUMMARY OF THE INVENTION

The present invention relates to a method for determining an end of tailback in road traffic and relevant devices.

Road traffic tailbacks are a nuisance occurring worldwide, which is also associated with considerable economic losses.

For this reason, there have been tailback signaling and tailback warning devices and relevant institutions for a long time. For example, there are tailback warning panels which warn against possible tailbacks on approach roads to freeways, electronic tailback warning signs on freeways which attempt to prevent or to moderate tailbacks by means of suitable speed limits and information signs or also tailback warning messages in radios or warning information for navigation systems.

A relatively new approach consists in sending movement information automated to an evaluation service by means of a smartphone application.

This service needs relatively high battery power of the smartphone since movement information has to be sent regularly to the tailback service operator in order to provide for relevant information on whether a tailback is arising and in which section it is currently present. It has to be expected that an increasing number of users sets their readiness for conveying corresponding data on the basis of considerations of the data protection law as a precaution. The reliability of such tailback detection services would presumably suffer from this.

It would be desirable, therefore, to provide a possibility which reliably enables tailbacks and their limits to be detected, in doing so to save batteries of mobile radio devices and additionally to preserve the privacy of mobile radio device users.

It is the aim of the invention to propose a possibility which avoids or at least prevents at least a part of the disadvantages known in the prior art.

In this context, the subject matter of the main claim relates to a method for determining an end of tailback in road traffic, the method exhibiting: providing a signal quality map for a cell of a base station of a mobile radio system, the signal quality map having overview information about signal qualities occurring within the cell; determining signal quality information for each mobile radio communication device connected to the base station; determining a probability density function based on the corresponding signal quality information determined; determining a location of the probability density function having a function gradient which corresponds to an angular amount of at least 75° with respect to a horizontal function axis of the probability density function, preferably an angular amount between 80° and 90°, especially preferably an angular amount between 85° and 90°. In this context, the location is indicative of a tailback limit in the cell of the base station. And determining of a location of the tailback limit based on the location determined and the signal quality map.

In this context, the method steps can be carried out automated.

A signal quality map in the sense of the invention can then have information which provides a reference about respective current signal qualities at various positions on the map. Thus, the signal qualities of a cell of a base station can be mapped. It can thus be provided for that with an incoming signal of a mobile radio communication device to the base station, by means of the signal quality of this incoming radio link, the position of the corresponding mobile radio communication device can be determined more precisely by being shown in the signal quality map at which position or at which positions in the signal quality map the corresponding signal quality of the incoming signal is registered. If the mobile radio communication device is in motion, the variation of position can be determined by means of the different signal qualities then occurring being matched to the signal qualities registered in the signal quality map, and thus the current position can be determined even more precisely.

Signal quality information in the sense of the invention can here be information which allows a statement about the signal quality with which a mobile radio communication device is sending. The signal quality can be measured at the base station and it is thus possible to infer the signal quality of the transmitter, that is to say the mobile radio communication device, on the basis of the measured signal quality at the receiver, that is to say the base station.

A probability density function in the sense of the invention can then be a function which allows a statement about how various mobile radio communication devices are distributed within this probability density function. As a result, it is possible to determine mobile radio communication devices which are located in a tailback with a certain probability.

In this context, signal quality values of mobile radio communication devices which belong to vehicles which are located in the tailback have a strong correlation since vehicles in the tailback are close to one another. Accordingly, these also have a high probability of occurrence since the number of vehicles, or the vehicle density, respectively, within a tailback is large, as a rule.

The signal quality values of mobile radio communication devices which belong to vehicles which are not located in a tailback have instead no or only little correlation since the spatial distance between these vehicles is larger. The probability of occurrence is correspondingly also lower since the number of vehicles or, respectively, the vehicle density is lower at a location outside a tailback.

A tailback limit in the sense of the invention can be considered to mean both the start and the end of an occurring traffic tailback or traffic tailback area, respectively.

By means of the teaching according to the invention, the advantage is achieved that, without installing an additional application in a smartphone, tailbacks can be detected by means of mobile radio communication devices. Furthermore, it is also possible, by means of the teaching according to the invention, to determine a tailback limit and thus a tailback start and a tailback end of the relevant tailback. This can take place by means of the standard communication occurring naturally between a base station and mobile radio communication devices located within the cell of the base station. Thus, no additional communication data occur and it is also possible to obtain non-additional use-specific information by which means the private sphere of persons is not impaired more than is legally intended. Due to the fact that no additional communication data occur, the batteries of the corresponding mobile radio communication devices contributing to the tailback detection service are not loaded more than usually with respect to energy and are thus preserved. Furthermore, due to the fact that no additional communication data occur, additional transaction costs of the users of the mobile radio communication devices cannot occur.

The subject matter of a subordinate claim relates to a system for detecting a tailback end in road traffic, the system exhibiting: a base station of a mobile radio system; a signal measuring device and a signal analysis device. In this context, the base station is configured to manage mobile radio communication devices connected to the base station and to transmit at least a part of a signal conveyed to the base station to the signal measuring device. The signal measuring device is configured to determine a signal quality of the signal conveyed to the base station and to transmit the signal quality determined to the signal analyzing device. And in this context, the signal analyzing device is configured to carry out a method according to the invention.

In this context, a base station in the sense of the invention can be a device which is suitable for providing for the communication of mobile radio communication devices in that it manages the mobile communication devices and appropriately routes links in each case coming from them or going to them in order to establish or maintain the desired connections.

A signal measuring device in the sense of the invention can then have a device which is configured to determine the signal strength and/or signal quality of an incoming link and to provide corresponding signal quality information.

A signal analyzing device in the sense of the invention can then have a device which is suitable for evaluating a corresponding signal quality information item and to execute with this a corresponding method according to the invention.

By means of the teaching according to the invention, the advantage is achieved that due to the fact that the technology for tailback detection is arranged distributed outside the mobile radio communication devices involved and tailbacks can be detected by means of mobile radio communication devices without installing an additional application on a smartphone, by means of the standard communication occurring naturally between a base station and mobile radio communication devices located within the cell of the base station, as a result of which no additional communication data thus occur and no additional user-specific information can be obtained either, as a result of which the private sphere of persons is not impaired any more than is legally intended. Due to the fact that no additional communication data occur, the batteries of the corresponding mobile radio communication devices contributing to the tailback detection service are also not loaded more than usual with regard to energy and are thus preserved. Furthermore, due to the fact that no additional communication data occur, there are no additional transaction costs to the users of the mobile radio communication devices.

Furthermore, this provides the advantage that existing base stations do not have to be expensively retrofitted.

The subject matter of a further parallel claim relates in this context to a base station for a mobile radio system. The base station has here a signal measuring device and a signal analyzing device. In this context, the signal measuring device is configured to determine a signal quality of a signal conveyed to the base station and to transmit the determined signal quality to the signal analyzing device. And in this context, the signal analyzing device is configured to carry out a method according to the invention.

By means of the teaching according to the invention, the advantage is achieved that due to the fact that the technology for tailback detection is arranged in the base station and without installing an additional application on a smartphone, tailbacks can be detected by means of mobile radio communication devices, by means of the standard communication naturally occurring between a base station and mobile radio communication devices located within the cell of the base station, as a result of which no additional communication data thus occur and no additional user-specific information can be obtained either, as a result of which the private sphere of persons is not impaired more than legally intended. Due to the fact that no additional communication data occur, the batteries of the corresponding mobile radio communication devices contributing to the tailback detection service are also not loaded more than usual with regard to energy and are thus preserved.

Furthermore, due to the fact that no additional communication data occur, there are no additional transaction costs to the users of the mobile radio communication devices.

Due to the fact that the technology for tailback detection is arranged in the base station, a current tailback detection can take place particularly rapidly and motor vehicles with mobile radio communication devices, driving into the cell, can be informed particularly rapidly about a tailback located in the vicinity.

The subject matter of a further parallel claim here relates to a computer program product for a system according to the invention and/or for a base station according to the invention, wherein the system and/or the base station can be operated in each case in accordance with a method according to the invention.

Due to the teaching according to the invention, the advantage is achieved that the method can be carried out particularly efficiently in an automated manner.

The subject matter of a further parallel claim here relates to a data medium having a computer program product according to the invention.

By means of the teaching according to the invention, the advantage is achieved that the method can be distributed particularly efficiently to the devices and/or systems carrying out the method or kept available, respectively.

Before embodiments of the invention are described more thoroughly in the text which follows, it must be noted firstly that the invention is not restricted to the components described or the method steps described. Furthermore, the terminology used does not represent a restriction either, but is only of an exemplary nature. In as much as the singular is used in the description and claims, it also comprises the plural in each case unless the context explicitly excludes this. Any method steps can be carried out automated unless this is explicitly excluded by the context.

In the text which follows, further exemplary embodiments of the method according to the invention will be explained.

According to a first exemplary embodiment, the method also shows that the determining of the signal quality information takes place for each mobile radio communication device connected to the base station, based on a corresponding Reference Signal Receive Power and/or based on a corresponding Sounding Reference Signal of the corresponding mobile radio communication device.

A Reference Signal Receive Power in the sense of the invention can then be the average of the linear amount of power of the resource elements which achieve the cell-specific reference signals within the measurement frequency bandwidth considered and defined. As a rule, the cell-specific reference signal R0 according to 3GPP "TS 36.211" can be used.

A Sounding Reference Signal in the sense of the invention can then be a reference signal for determining the channel quality of an uplink path for each subsection or frequency region.

This embodiment has the advantage that no additional information to those which are necessary for operating the mobile radio network have to be exchanged in order to measure the signal quality. Accordingly, no additional energy is required in the mobile radio communication device and there are also no additional data costs for the user of the mobile radio communication device.

According to a further exemplary embodiment, the method also comprises: determining of mobile radio communication devices located in the tailback, based on a selection from a tailback determining group, the tailback determining group exhibiting: the signal quality information determined, the signal quality map provided, direction-of-movement information for each mobile radio communication device connected to the base station and speed-of-movement information for each mobile radio communication device connected to the base station. And the determining of the probability density function then takes place based on the mobile radio communication devices located in the tailback.

A mobile radio communication device located in the tailback, in the sense of the invention, can then be a mobile radio communication device which is located in a traffic tailback. A mobile radio communication device which is in a spatial vicinity of other mobile radio communication devices on a road and does not or only slowly changes its position in a correspondingly large time interval can be considered as being in the tailback.

This embodiment has the advantage that a tailback or respectively a start of a tailback and/or a tailback limit can be determined for each cell of a cellular mobile radio network by which means the precision of prediction or precision of determination can be increased.

According to a further exemplary embodiment, the method also comprises that each signal quality information item of each mobile radio communication device connected to the base station has information with respect to a signal quality in a time interval.

A time interval in the sense of the invention can then be a correspondingly long and concluded, constant period of time.

This embodiment has the advantage that corresponding intervals can be determined as a result of which a prediction or determination, respectively, of a tailback area can take place more precisely and more dynamically.

According to a further exemplary embodiment, the method also comprises that the time interval is identical for all corresponding mobile radio communication devices.

This embodiment has the advantage that the more precise and dynamic prediction or determination, respectively, of a tailback area can take place in a simpler manner since the mathematical complexity can be reduced by fixed intervals for all mobile radio communication devices in a cell.

According to a further exemplary embodiment, the method also comprises that the providing of the signal quality map for the cell of the base station of the mobile radio system exhibits: determining of the signal quality map on the basis of a gain of a channel of the mobile radio system and/or based on received signal quality information of corresponding mobile radio communication devices connected to the base station, in each case in dependence on a location within the cell of the base station.

This embodiment has the advantage that the signal quality map becomes dynamically determinable.

According to a further exemplary embodiment, the method also exhibits determining the direction-of-movement information for each mobile radio communication device connected to the base station. In this context, each corresponding direction-of-movement information item exhibits information about a direction of movement of the corresponding mobile radio communication device. And the determining of the direction-of-movement information takes place for each mobile radio communication device connected to the base station on the basis of the signal quality map and in this context, the determining of mobile radio communication devices located close to one another locally additionally takes place based on the direction-of-movement information determined.

This embodiment has the advantage that the prediction or determination, respectively, of a tailback can take place even more precisely since it can thus be determined in which direction of travel a tailback arises or exists.

According to a further exemplary embodiment, the method also exhibits determining of the speed-of-movement information for each mobile radio communication device connected to the base station. In this context, each corresponding speed-of-movement information item exhibits information about a speed of movement of the corresponding mobile radio communication device. And in this process, the speed-of-movement information for each mobile radio communication device connected to the base station is determined based on a corresponding Doppler shift, of a corresponding signal sent by the corresponding mobile radio communication device to the base station.

This embodiment has the advantage that the prediction or determination, respectively, of a tailback can take place even more precisely since it is thus possible to determine in which direction of travel a tailback arises or exists.

Furthermore, it has the advantage that the direction of travel of a motor vehicle can be determined in a simple manner with a corresponding mobile radio communication device inside the vehicle.

In accordance with a first exemplary embodiment, the base station also has a speed determining device for determining a speed of movement for each mobile radio communication device connected to the base station.

This embodiment has the advantage that the prediction or determination, respectively, of a tailback can take place even more precisely since it can thus be determined in which direction of travel a tailback arises or exists.

A further advantage is that it can be determined even more precisely whether a vehicle is in a tailback since vehicles which are moving forward with a high speed cannot be located in a tailback.

The invention thus allows very precise tailback areas to be determined in that standard information transmitted within a cell of a cellular mobile radio network can be evaluated correspondingly by mobile radio communication devices located therein.

Other objects, advantages and novel features of the present invention will become apparent from the following detailed description of one or more preferred embodiments when considered in conjunction with the accompanying drawings.

BRIEF DESCRIPTION OF THE DRAWINGS

In the text which follows, the invention will be explained more thoroughly by means of figures, in which.

DETAILED DESCRIPTION OF THE DRAWINGS

Figure 1:
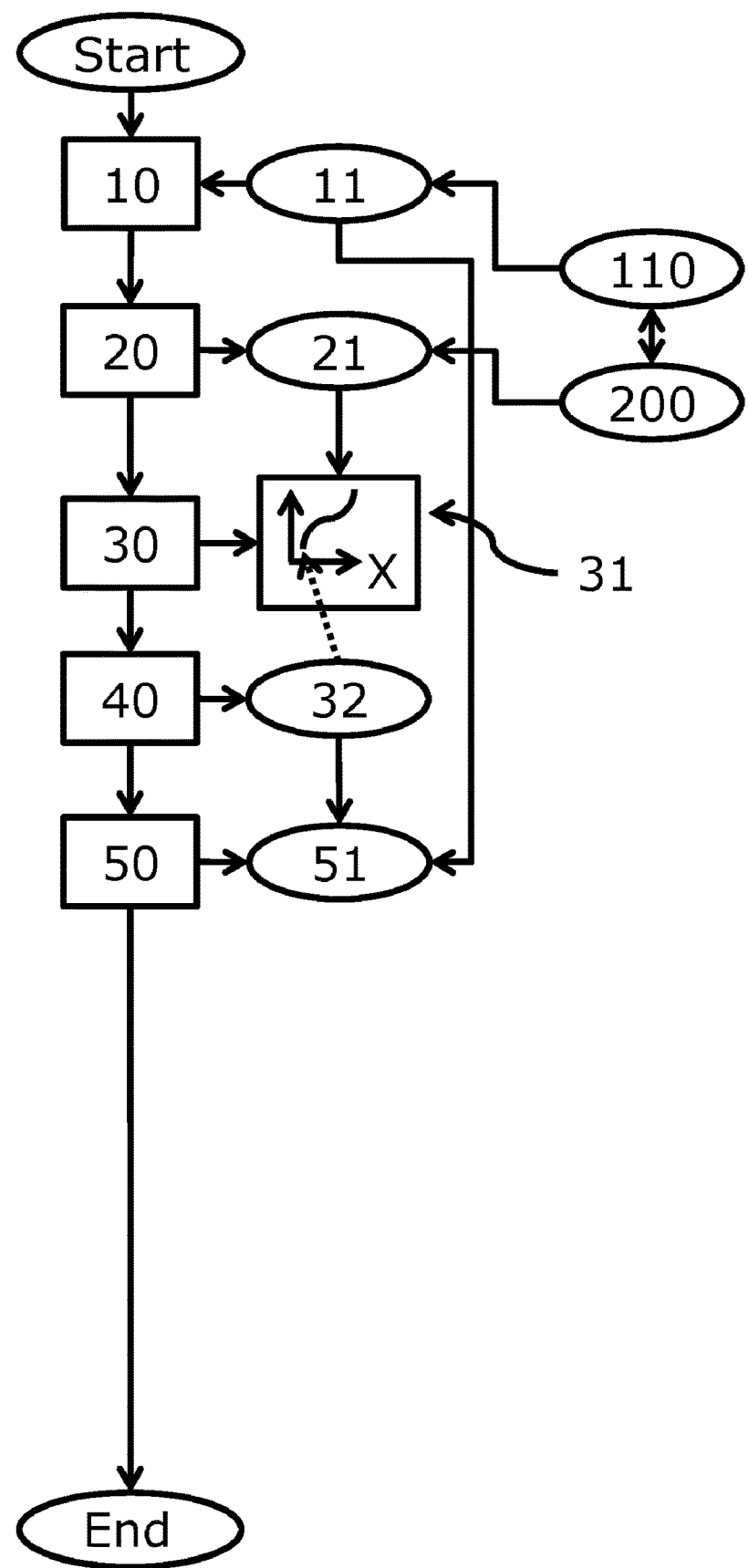
FIG. 1 shows a diagrammatic representation of a proposed method according to an exemplary embodiment of the invention.

FIG. 1 shows a diagrammatic representation of a proposed method according to an exemplary embodiment of the invention.

In this context, FIG. 1 shows a diagrammatic representation of a method for determining a tailback end in road traffic, the method exhibiting: providing 10 a signal quality map 11 for a cell of a base station 110 of a mobile radio system, the signal quality map 11 having an overview information of signal qualities occurring within the cell. Determining 20 of signal quality information 21 for each mobile radio communication device 200 connected to the base station 110. Determining 30 a probability density function 31 based on the corresponding signal quality information 21 determined. Determining 40 of a location 32 of the probability density function 31 with a function gradient which corresponds to an angular amount of at least 75° with respect to a horizontal function axis X of the probability density function, preferably to an angular amount between 80° and 90°, particularly preferably to an angular amount between 85° and 90°. In this context, the location 32 is indicative of a tailback limit in the cell of the base station. Furthermore, the method comprises determining 50 a location 51 of the tailback limit based on the location 32 determined and the signal quality map 11. The angular amount should be calculated in accordance with an interval on the function axis X and Y. In the case that the signal quality information can be specified in dB, the angular amount could be calculated, for example, in accordance with an interval of 1 dB on the function axis X and of 2% on the function axis Y.

Figure 2:
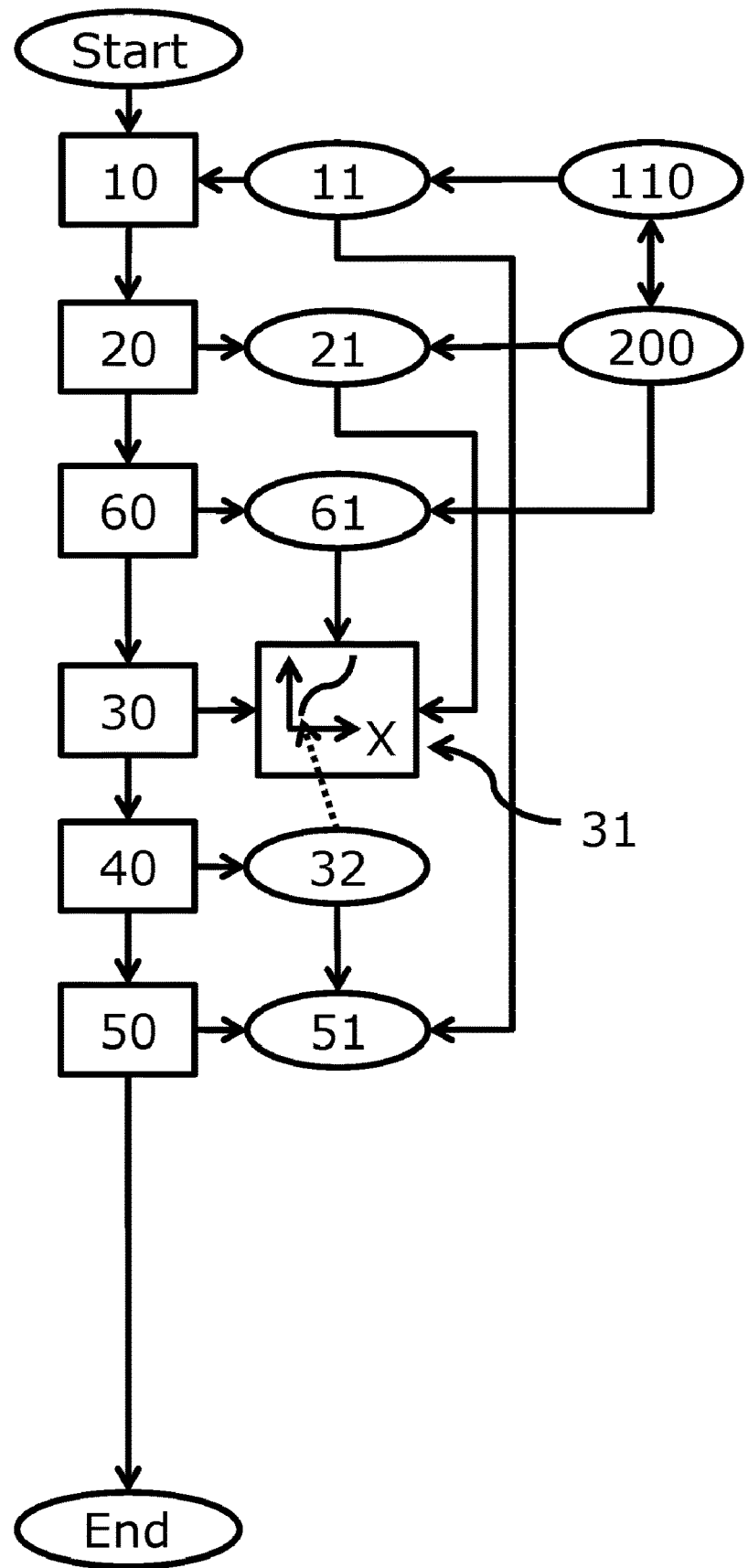
FIG. 2 shows a diagrammatic representation of a proposed method according to a further exemplary embodiment of the invention.

FIG. 2 shows a diagrammatic representation of a proposed method according to a further exemplary embodiment of the invention.

FIG. 2 then shows a diagrammatic representation of a method expanded compared with the method from FIG. 1. What has been said before with respect to FIG. 1 correspondingly applies to FIG. 2.

As can be seen from FIG. 2, the method for determining an end of tailback in road traffic also exhibits: determining 60 of mobile radio communication devices 200 located in the tailback 61 on the basis of a selection from a tailback determining group, the tailback determining group having: the signal quality information 21 determined, the signal quality map 11 provided, direction of movement information 71 for each mobile radio communication device 200 connected to the base station 110 and speed-of-movement information 81 for each mobile radio communication device 200 connected to the base station 110. And in this context the probability density function 31 is determined 30 on the basis of the mobile radio communication devices 200 located in the tailback 61.

Determining of the signal quality information 21 for each mobile radio communication device 200 connected to the base station 110 then takes place on the basis of a corresponding Reference Signal Receive Power and/or on the basis of a corresponding Sounding Reference Signal of the corresponding mobile radio communication device 200.

Figure 3:
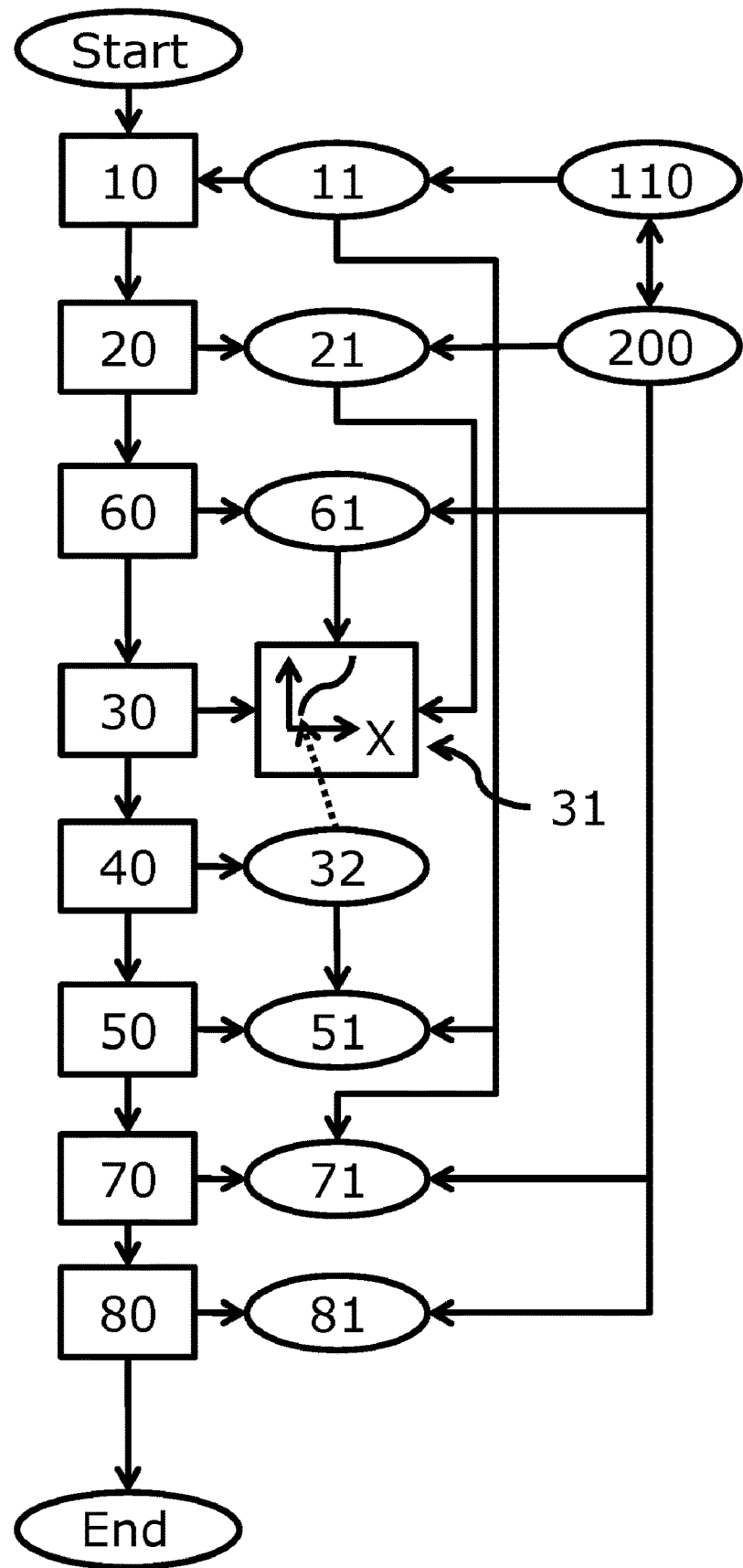
FIG. 3 shows a diagrammatic representation of a proposed method according to a further exemplary embodiment of the invention.

FIG. 3 shows a diagrammatic representation of a proposed method according to a further exemplary embodiment of the invention.

FIG. 3 then shows a diagrammatic representation of a method expanded compared with the method from FIG. 1 and FIG. 2. That which has been said previously with respect to FIG. 1 and FIG. 2 correspondingly still applies to FIG. 3.

As can be seen from FIG. 3, the method for determining an end of tailback in road traffic also comprises: determining 70 the direction-of-movement information 71 for each mobile radio communication device 200 connected to the base station 110. Each corresponding direction-of-movement information 71 item exhibits information about a direction of movement of the corresponding mobile radio communication device 200. And the determining of the direction-of-movement information 71 for each mobile radio communication device 200 connected to the base station 110 takes place on the basis of the signal quality map 11. And determining mobile radio communication devices 200 locally close to one another additionally takes place on the basis of the direction-of-movement information 71 determined.

In this context, each signal quality information item 21 of each mobile radio communication device 200 connected to the base station 110 exhibits information with respect to a signal quality in a time interval. The time interval can be identical for all corresponding mobile radio communication devices 200.

Furthermore, the method for determining an end of tailback in road traffic of FIG. 3 comprises: determining 80 of the speed-of-movement information 81 for each mobile radio communication device 200 connected to the base station 110, each corresponding speed-of-movement information item 81 having information about a speed of movement of the corresponding mobile radio communication device 200. And determining of the speed-of-movement information 81 for each mobile radio communication device connected to the base station takes place here on the basis of a corresponding Doppler shift, of a signal sent by the corresponding mobile radio communication device to the base station.

Figure 4:
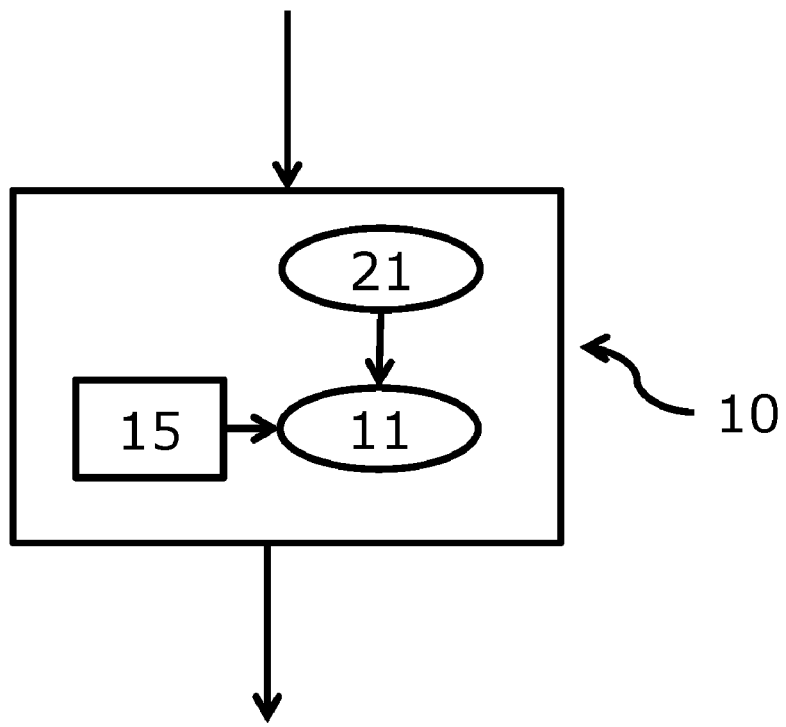
FIG. 4 shows a diagrammatic representation of a part of a proposed method according to a further exemplary embodiment of the invention.

FIG. 4 shows a diagrammatic representation of a part of a proposed method according to a further exemplary embodiment of the invention.

In this context, FIG. 4 shows a diagrammatic representation of a method expanded compared with the method of FIGS. 1 to 3. For the sake of clarity, however, only the expanded part of the method is shown in FIG. 4.

As can be seen in FIG. 4, the method for determining an end of a tailback in road traffic additionally shows that the providing 10 of the signal quality map 11 for the cell of the base station 110 of the mobile radio system exhibits: determining 15 of the signal quality map 11 on the basis of a gain of a channel of the mobile radio system and/or on the basis of received signal quality information 21 of corresponding mobile radio communication devices 200 connected to the base station 110, in each case in dependence on a location within the cell of the base station 110.

Figure 5:
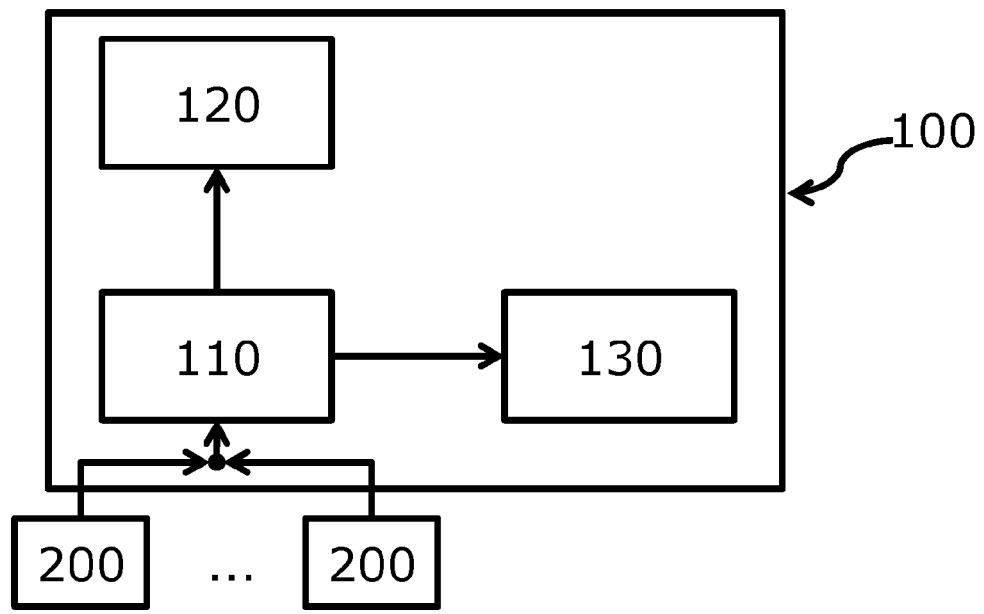
FIG. 5 shows a diagrammatic representation of a proposed system according to an exemplary embodiment of the invention.

FIG. 5 shows a diagrammatic representation of a proposed system according to an exemplary embodiment of the invention.

In this context, FIG. 5 shows a diagrammatic representation of a system 100 for detecting an end of tailback in road traffic, the system having: a base station 110 of a mobile radio system, a signal measuring device 120 and a signal analyzing device 130, the base station 110 being configured to manage mobile radio communication devices 200 connected to the base station 110 and to transmit at least a part of a signal conveyed to the base station 110 to the signal measuring device 120. The signal measuring device 120 is configured to determine a signal quality of a signal conveyed to the base station 110 and to transmit the signal quality determined to the signal analyzing device 130, the signal analyzing device 130 being configured to carry out a method according to the invention.

Figure 6:
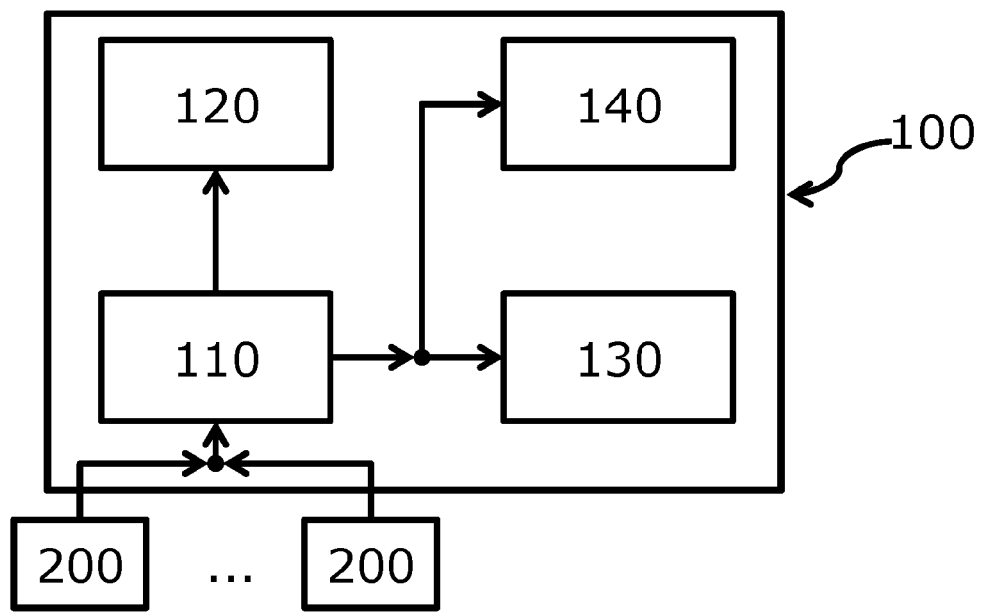
FIG. 6 shows a diagrammatic representation of a proposed system according to a further exemplary embodiment of the invention.

FIG. 6 shows a diagrammatic representation of a proposed system according to a further exemplary embodiment of the invention.

FIG. 6 then shows a diagrammatic representation of a system expanded compared with the system of FIG. 5.

As can be seen from FIG. 6, the system 100 also has a speed-determining device 140 for detecting an end of tailback in road traffic, for determining a speed of movement for each mobile radio communication device 200 connected to the base station 110.

Figure 7:
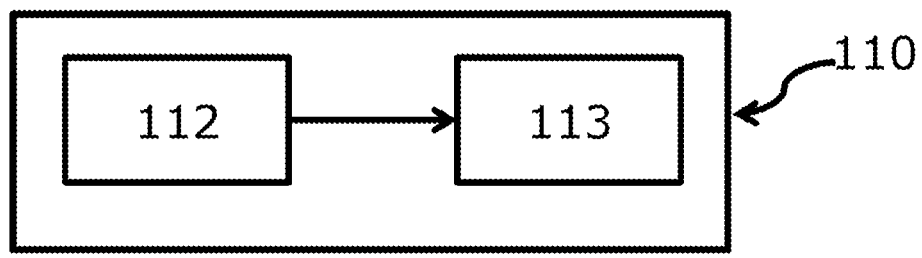
FIG. 7 shows a diagrammatic representation of a proposed device according to an exemplary embodiment of the invention.

FIG. 7 shows a diagrammatic representation of a proposed device according to an exemplary embodiment of the invention.

In this context, FIG. 7 shows a base station 110 according to the invention for a mobile radio system, the base station 110 having: a signal measuring device 112 and a signal analyzing device 113. In this invention, the signal measuring device 112 is configured to determine a signal quality of a signal conveyed to the base station 110 and to transmit the signal quality determined to the signal analyzing device 113. And the signal analyzing device 113 is then configured to carry out a method according to the invention.

Figure 8:
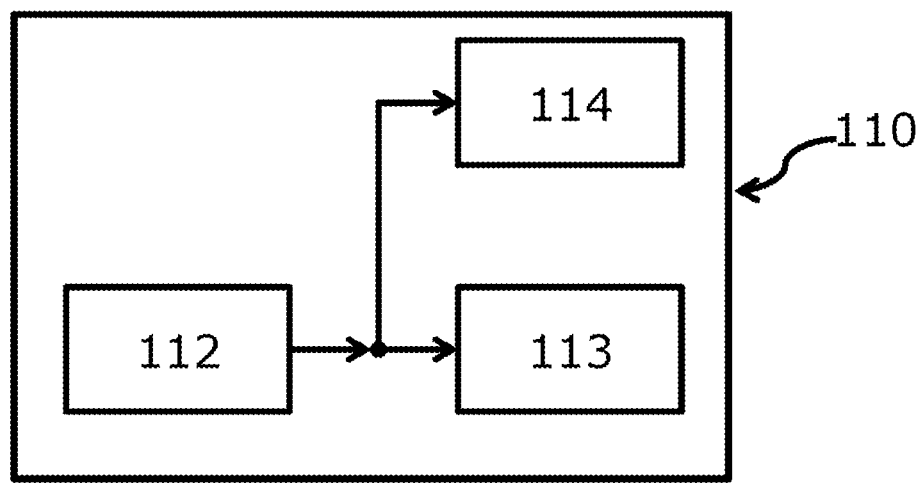
FIG. 8 shows a diagrammatic representation of a proposed device according to a further exemplary embodiment of the invention.

FIG. 8 shows a diagrammatic representation of a proposed device according to a further exemplary embodiment of the invention.

FIG. 8 here shows a diagrammatic representation of a device expanded in comparison with the device of FIG. 5.

FIG. 8 then shows a base station 110 according to the invention which also has a speed-determining device 114 for determining a speed of movement for each mobile radio communication device 200 connected to the base station 110.

In summary, it can be noted for the system 100 and/or the base station 110 in connection with a method according to the invention:

The signal analyzing device 113 is configured to detect by means of a method according to the invention a start of tailback or an end of tailback, within the coverage area of the base station 110. For example, it is possible to determine the number and speed of movement of the mobile radio communication devices 200 connected to the base station 110 and to detect by means of this information the presence of a tailback within the coverage area of the base station 110. By means of the signal qualities determined, signal quality information 21 can be determined with respect to the corresponding mobile radio communication devices 200. Thus, it also becomes possible to detect, by means of matching this information with a precalculated signal quality map 11 a start of tailback and/or an end of tailback.

The signal analyzing device 113 and/or base station 110 can thus be configured to create and/or currently keep available a pool of statistical information from which the signal quality map 11 can be generated. This pool can consist of information which enables corresponding signal quality information 21 to be determined for the mobile radio communication devices 200 connected to the base station 110. Furthermore, the directions of movement of the mobile radio communication devices 200 connected to the base station 110 can also be determined by means of this pool.

One possibility for determining the signal quality map 11 is the performance of a test operation with a correspondingly high number of test positions within the coverage area of the base station 110 in which the respective signal qualities are determined for the corresponding test positions.

A further possibility is the utilization of various software tools which allow the signal qualities to be modeled realistically within the coverage area of the base station 110.

The signal quality map 11 can be obtained as described in the text which follows:

$y=f(x)$, y corresponding to the channel gain—also called gain, or the received signal intensity, respectively—for example in dB and x corresponding to positions within the coverage area of the base station 110. x can here be interpreted as a scalar variant to be compared with, which by means of a comparison with another such scalar variant, can indicate a direction of movement. In this context, it is assumed that $0=f(0)$ applies to the edges of the coverage area of the base station 110.

It is a further task of the signal analyzing device 113 to determine the distribution of signal quality information 21 determined on the signal quality map 11. The determination of the signal quality information 21 can take place here in real time. Hence, it is possible to determine a start of a tailback and/or an end of tailback within the coverage area of the base station 110.

An algorithmic example of this is described in the text which follows:

Initially, it is assumed, for example, that a traffic tailback begins at an edge of the coverage area of the base station 110 and ends somewhere within the coverage area of the base station 110.

The determined signal quality information 21 of the mobile radio communication devices 200 corresponds here to motor vehicles within the coverage area of the base station 110 at a time t, with:

$y(t)=[y1(t), y2(t), \ldots ]$, the index of y corresponding to the vehicle IDs.

This results in a series of vectors which have information of motor vehicles which are located within the coverage area of the base station 110.

By this means, a probability density function pyt(y) of all measurements can be calculated within a time interval [t0, t1].

Calculate the probability density function of the function f(x) as pf(y).

Calculate the radio-frequency part of the probability density function: $ph(y)=pyt(y)-k*pf(y)$, k being a factor which corresponds to a low-frequency part of pyt(y) with pf(y).

A practical possibility for the calculation is:

$$k = \frac{1}{a}\int_0^a \frac{p_{yt}(y)}{p_f(y)}\,dy$$

Filtering can be performed for removing those measurement values which correspond to motor vehicles which are not located in the tailback. In this context, the filtering can also affect individual motor vehicles which are located in the tailback. Thus, however, only motor vehicles remain which are located in the tailback.

This results in patterns for ph(y) for which in each case a tailback limit, that is to say start of tailback/end of tailback, can be determined for which the following applies: f(x)=y0. This designates a point of the function ph(y), at which the steepness of the function curve abruptly increases from ph(y), thus corresponding at least to 75°. Particularly preferably this corresponds to between 80 and 90°.

The concept of the invention can be summarized as follows. A method, a system and a relevant device are provided by means of which it can become possible to determine a tailback area along a road. For this purpose, data sent as standard from mobile radio communication devices to a base station connected to these mobile radio communication devices located onboard of vehicles are used for determining vehicles which are in a tailback. By means of a probability density function arising from this, an end of a tailback can be inferred. By this means, a tailback area with a start of tailback and end of tailback limiting the tailback can be determined and thus, in particular, a start of tailback can be determined. These data can be forwarded to corresponding motor vehicles and/or tailback warning systems in order to be able to warn, in particular, motor vehicles which are not yet in the tailback and to be able to offer them near-term and current escape routes.

If a tailback is determined along a road in the area of a base station, but no tailback limit is determined, it is possible to conclude therefrom that the traffic along this road is completely in tailback in the coverage area of the base station. The limit of tailback can then be sought or determined in another base station. By this means, a tailback area beyond the base station can be determined along the relevant road.

LIST OF REFERENCE SYMBOLS

10 Providing a signal quality map
11 Signal quality map
20 Determining signal quality information
21 Signal quality information
30 Determining a probability density function
31 Probability density function
32 Location of the probability density function
40 Determining a location of the probability density function
50 Determining a location of the end of tailback
51 Location of the end of tailback
60 Determining mobile radio communication devices located in the tailback
61 Mobile radio communication device located in the tailback
70 Determining the direction-of-movement information
71 Direction-of-movement information
80 Determining the speed-of-movement information
81 Speed-of-movement information
100 System for detecting an end of tailback
110 Base station
112 Signal measuring device
113 Signal analyzing device
114 Speed-determining device
120 Signal measuring device
130 Signal analyzing device
140 Speed-determining device
200 Mobile radio communication device
X Horizontal function axis of the probability density function The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining an end of a tailback in road traffic, the method comprising:
   providing a signal quality map for a cell of a base station of a mobile radio system, wherein the signal quality map includes overview information about signal qualities occurring within the cell;
   determining signal quality information for each of a plurality of mobile radio communication devices connected to the base station;
   determining a probability density function based on determined signal quality information;
   determining a location of the probability density function having a function gradient which corresponds to an angular amount of at least 75° with respect to a horizontal function axis of the probability density function, wherein the location is indicative of a tailback limit in the cell of the base station;
   determining a location of the tailback limit based on the determined location and the signal quality map; and
   transmitting data corresponding to the location of the tailback limit to a motor vehicle that is not in the tailback.

2. The method as claimed in claim 1, wherein determining of the signal quality information comprises determining signal quality information for each of the plurality of mobile radio communication devices connected to the base station based on at least one of a corresponding Reference Signal Receive Power and a corresponding Sounding Reference Signal for corresponding ones of the plurality of mobile radio communication devices.

3. The method as claimed in claim 1, the method further comprises:
   determining one or more of the plurality of mobile radio communication devices located in the tailback, based on a selection from a tailback determining group, the tailback determining group exhibiting:
   the signal quality information determined,
   the signal quality map provided,
   direction-of-movement information for each mobile radio communication device connected to the base station, and
   speed-of-movement-information for each mobile radio communication device connected to the base station, and
   wherein the determining of the probability density function takes place based on the mobile radio communication devices located in the tailback.

4. The method as claimed in claim 2, the method further comprises:
   determining one or more of the plurality of mobile radio communication devices located in the tailback, based on a selection from a tailback determining group, the
tailback determining group exhibiting:
the signal quality information determined,
the signal quality map provided,
direction-of-movement information for each mobile radio communication device connected to the base station, and
speed-of-movement-information for each mobile radio communication device connected to the base station, and
wherein the determining of the probability density function takes place based on the mobile radio communication devices located in the tailback.

5. The method as claimed in claim 1, wherein the signal quality information for each of the plurality of mobile radio communication devices connected to the base station comprises information with respect to a signal quality in a time interval.

6. The method as claimed in claim 2, wherein the signal quality information for each of the plurality of mobile radio communication devices connected to the base station comprises information with respect to a signal quality in a time interval.

7. The method as claimed in claim 3, wherein the signal quality information for each of the plurality of mobile radio communication devices connected to the base station comprises information with respect to a signal quality in a time interval.

8. The method as claimed in claim 5, wherein the time interval is identical for all corresponding ones of the plurality of mobile radio communication devices.

9. The method as claimed in claim 1, wherein providing the signal quality map for the cell of the base station of the mobile radio system comprises determining the signal quality map on the basis of a gain of a channel of the mobile radio system and/or based on received signal quality information of corresponding ones of the plurality of mobile radio communication devices connected to the base station, in each case depending on a location within the cell of the base station.

10. The method as claimed in claim 3, the method further comprising:
determining direction-of-movement information for each of the plurality of mobile radio communication devices connected to the base station, wherein
the direction-of-movement information includes information about a direction of movement of corresponding ones of the plurality of mobile radio communication devices, and
wherein determining the direction-of-movement information comprises determining direction-of-movement information for each of the plurality of mobile radio communication devices connected to the base station based on the signal quality map, and
wherein determining one or more of the plurality of mobile radio communication devices located in the tailback comprises determining one or more of the plurality of mobile radio communication devices located in the tailback based on the direction-of-movement information.

11. The method as claimed in claim 5, the method further comprising:
determining direction-of-movement information for each of the plurality of mobile radio communication devices connected to the base station, wherein
the direction-of-movement information includes information about a direction of movement of corresponding ones of the plurality of mobile radio communication devices, and
wherein determining the direction-of-movement information comprises determining direction-of-movement information for each of the plurality of mobile radio communication devices connected to the base station based on the signal quality map, and
wherein determining one or more of the plurality of mobile radio communication devices located in the tailback comprises determining one or more of the plurality of mobile radio communication devices located in the tailback based on the direction-of-movement information.

12. The method as claimed in claim 3, further comprising:
determining the speed-of-movement information for each of the plurality of mobile radio communication devices connected to the base station, wherein the speed-of-movement information includes information about a speed of movement for each of the plurality of mobile radio communication devices, and
wherein determining the speed-of-movement information for each of the plurality of mobile radio communication devices connected to the base station comprises determining the speed-of-movement information for each of the plurality of mobile radio communication devices connected to the base station based on a corresponding Doppler shift of a corresponding signal sent by a corresponding one of the plurality of mobile radio communication devices to the base station.

13. The method as claimed in claim 5, further comprising:
determining the speed-of-movement information for each of the plurality of mobile radio communication devices connected to the base station, wherein the speed-of-movement information includes information about a speed of movement for each of the plurality of mobile radio communication devices, and
wherein determining the speed-of-movement information for each of the plurality of mobile radio communication devices connected to the base station comprises determining the speed-of-movement information for each of the plurality of mobile radio communication devices connected to the base station based on a corresponding Doppler shift of a corresponding signal sent by a corresponding one of the plurality of mobile radio communication devices to the base station.

14. The method as claimed in claim 10, further comprising:
determining the speed-of-movement information for each of the plurality of mobile radio communication devices connected to the base station, wherein the speed-of-movement information includes information about a speed of movement for each of the plurality of mobile radio communication devices, and
wherein determining the speed-of-movement information for each of the plurality of mobile radio communication devices connected to the base station comprises determining the speed-of-movement information for each of the plurality of mobile radio communication devices connected to the base station based on a corresponding Doppler shift of a corresponding signal sent by a corresponding one of the plurality of mobile radio communication devices to the base station.

15. vA system for detecting an end of a tailback in road traffic, the system comprising:
a base station of a mobile radio system;

a signal measuring device; and a signal analyzing device, wherein the base station is configured to manage a plurality of mobile radio communication devices connected to the base station and to transmit at least a part of a signal conveyed to the base station to the signal measuring device, wherein the signal measuring device is configured to determine a signal quality of a signal conveyed to the base station, and transmit the signal quality determined to the signal analyzing device, and wherein the base station is configured to transmit said data corresponding to the location of the tailback limit to the motor vehicle that is not in the tailback, and wherein the signal analyzing device is configured to carry out the remaining method according to claim 1.

16. The system as claimed in claim 15, further comprising:

a speed-determining device configured to determine a speed of movement for each of the plurality of mobile radio communication devices connected to the base station.

17. A base station for a mobile radio system, the base station comprising:

a signal measuring device; and a signal analyzing device, wherein the signal measuring device is configured to determine a signal quality of a signal conveyed to the base station, and transmit the determined signal quality to the signal analyzing device, wherein the base station is configured to transmit said data corresponding to the location of the tailback limit to the motor vehicle that is not in the tailback, and wherein the signal analyzing device is configured to carry out the remaining method according to claim 1.

18. The base station as claimed in claim 17, the base station also exhibiting:

a speed determining device configured to determine a speed of movement for each mobile radio communication device connected to the base station.

* * * * *